US007225407B2

(12) United States Patent
Sommerer et al.

(10) Patent No.: US 7,225,407 B2
(45) Date of Patent: May 29, 2007

(54) RESOURCE BROWSER SESSIONS SEARCH

(75) Inventors: Ralph Sommerer, Cambridge (GB); Robert Tucker, Cambridge (GB); Natasa Milic-Frayling, Cambridge (GB); Jurij Leskovec, Horjul (SI)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 10/186,906

(22) Filed: Jun. 28, 2002

(65) Prior Publication Data

US 2004/0001104 A1   Jan. 1, 2004

(51) Int. Cl.
*G06F 3/00* (2006.01)
*G06F 17/00* (2006.01)

(52) U.S. Cl. ............... 715/738; 715/733; 715/853; 715/854; 715/855; 715/501.1; 707/3; 707/104.1

(58) Field of Classification Search ............ 715/733, 715/738, 764, 765, 810, 835, 838, 853, 854, 715/855, 501.1, 512, 513; 707/3, 100, 104.1
See application file for complete search history.

(56) References Cited

U.S. PATENT DOCUMENTS

| | | | | |
|---|---|---|---|---|
| 5,855,015 A * | 12/1998 | Shoham | .......... | 707/5 |
| 6,035,330 A * | 3/2000 | Astiz et al. | .......... | 709/218 |
| 6,035,332 A * | 3/2000 | Ingrassia et al. | .......... | 709/224 |
| 6,072,490 A * | 6/2000 | Bates et al. | .......... | 715/821 |
| 6,133,916 A * | 10/2000 | Bukszar et al. | .......... | 715/744 |
| 6,181,342 B1 * | 1/2001 | Niblack | .......... | 345/635 |
| 6,184,886 B1 * | 2/2001 | Bates et al. | .......... | 715/760 |
| 6,243,091 B1 * | 6/2001 | Berstis | .......... | 715/839 |
| 6,271,840 B1 * | 8/2001 | Finseth et al. | .......... | 715/513 |
| 6,310,630 B1 * | 10/2001 | Kulkarni et al. | .......... | 715/776 |
| 6,313,855 B1 * | 11/2001 | Shuping et al. | .......... | 715/854 |
| 6,460,060 B1 * | 10/2002 | Maddalozzo et al. | .......... | 715/513 |
| 6,549,944 B1 * | 4/2003 | Weinberg et al. | .......... | 709/224 |
| 6,578,078 B1 * | 6/2003 | Smith et al. | .......... | 709/224 |
| 6,606,657 B1 * | 8/2003 | Zilberstein et al. | .......... | 709/224 |
| 6,633,316 B1 * | 10/2003 | Maddalozzo et al. | .......... | 715/854 |
| 6,647,534 B1 * | 11/2003 | Graham | .......... | 715/526 |
| 6,801,906 B1 * | 10/2004 | Bates et al. | .......... | 707/3 |
| 6,820,111 B1 * | 11/2004 | Rubin et al. | .......... | 709/203 |
| 6,883,032 B1 * | 4/2005 | Dempski | .......... | 709/229 |
| 2002/0073058 A1 * | 6/2002 | Kremer et al. | .......... | 707/1 |
| 2002/0078043 A1 | 6/2002 | Pass et al. | | |
| 2002/0147805 A1 * | 10/2002 | Leshem et al. | | |
| 2003/0004995 A1 * | 1/2003 | Novaes | .......... | 707/513 |

(Continued)

OTHER PUBLICATIONS

Jason I. Hong et al, "WebQuilt: A Framework for Capturing and Visualizing the Web Experience", May 1-5, 2001, Computer Science Division University of California, 8 pages.*

(Continued)

*Primary Examiner*—Lucila X. Bautista

(57) ABSTRACT

A browser sessions search tool allows a user to search through records of previously viewed resource pages, even across multiple browser sessions. Each visit to a resource page results in creation of a visit data structure that references the resource page content. A rich assortment of data is recorded for each visited resource page, such as full text and layout data, time of access and navigation type that lead to the page. In one embodiment, color aspects of each resource page are stored to assist in a search, although other recorded resource page characteristics may additionally or alternatively include without limitation other visual, audio, navigational, or metadata aspects.

45 Claims, 10 Drawing Sheets

U.S. PATENT DOCUMENTS

2003/0014399 A1* 1/2003 Hansen et al. .................. 707/3
2003/0131097 A1* 7/2003 Kasriel et al. .............. 709/224
2003/0195901 A1* 10/2003 Shin et al.
2004/0003351 A1 1/2004 Sommerer et al.
2004/0034706 A1* 2/2004 Cohen et al.
2004/0205514 A1 10/2004 Sommerer et al.

OTHER PUBLICATIONS

Sarah Waterson et al, "What Did They Do? Understanding Clickstreams with the WebQuilt Visualization System", May 2002, ACM International Working Conference on Advanced Visual Interfaces, 7 pages.*

* cited by examiner

RESOURCE BROWSER SESSIONS SEARCH

RELATED APPLICATIONS

The application is related to U.S. patent application Ser. No. 10/186,933, entitled "NAVIGATING A RESOURCE BROWSER SESSION", filed Jun. 28, 2002, and U.S. patent application Ser. No. 10/187,160, entitled "HYPERLINK PREVIEW UTILITY AND METHOD" filed Jun. 28, 2002, both of which are specifically incorporated herein for all that they disclose and teach.

TECHNICAL FIELD

The invention relates generally to resource browsers, and more particularly to searching through resources previously visited by a user.

BACKGROUND OF THE INVENTION

Using a browser, a user may visit a large number of web sites in various browser sessions. At each web site, a user may also visit multiple web pages during an individual browser session. In some cases, a description and an address (e.g., the Uniform Resource Locator or URL) for a web page visited during a browser session may be saved in a sequential, stack-based "history" list, possibly allowing a user to return to a previously visited web page by selecting its description from the history list. A user can open the history list to select previously viewed resources, which are usually identified by the title or address of the web page. A user can also "bookmark" a currently viewed web page in a Favorites list to facilitate selection of the bookmarked resource from the Favorites list for a later visit.

Browsers can also be used to traverse a file system, and a history list can be used to return to a previously visited directory or file within the file system. Generally, browsers may be said to browse resources, whether on the Web, in a file system, or in some other type of data storage.

Existing session history lists present disadvantages that limit their usefulness. By recording only portions of a single browser session (e.g., because of the nature of the stack-like recording mechanism), much of a user's recent browsing experience is lost both during a given browser session. In addition, existing history lists do to not retain history information across multiple browser sessions. Even if the web page of interest is recorded in a history list, the user may not remember the name or address of previously viewed web page and may, therefore, find it difficult to identify the desired web page in the history list.

Some browsers also provide global history archive, which include all the URL's visited by the user merging the browsing information from multiple browser sessions. Such browsers also apply various strategies for saving information relating to previously visited web pages for further reuse. In response to the search over such saved information, the user typically obtains only a URL or a title of the resource in the result list. In the Web environment, such limited results would not typically satisfy a user because the user is often unaware of the URL of the site that they previously browsed. In addition, the title of a resource is frequently uninformative or inaccurate. Furthermore, the saved information does not include navigation information, which limits the usefulness of such prior approaches. For example, the user cannot reconstruct the navigations steps within a browser session from this information.

Likewise, bookmarking does not fully address a user's needs because the web page in question may not have seemed important when it was previously viewed and, therefore, the user may not have designated it for inclusion in the Favorites list at that time. Thus, the web page may be lost to the user forever, unless the web page address is still recorded in a history list or the user can remember how to get back to the desired web page (e.g., by remembering the URL or remembering how to navigate back to the web page).

Unfortunately, users frequently forget previous navigation patterns, addresses, page titles, or search parameters and, instead, remember key words, colors, sounds, or layout characteristics on a web page. During an exemplary browser session, a user may not be able to remember the complicated URL to that e-commerce web page having that attractive blue tie in the middle of the page, but may be able to quickly select it from a subset of previously visited web pages having the color blue in the middle of the page. However, existing solutions fail to provide functionality to support this kind of interaction.

SUMMARY OF THE INVENTION

Embodiments of the present invention solve the discussed problems by providing a sophisticated search tool for searching through a more complete set of recently visited resources within a single browser session or across multiple browser sessions. The record of previously visited resources need not be truncated by the stack-like operation of a standard session history list. Instead, all (or a configurable portion thereof) recently visited resource pages may be searched based on navigational details, content, metadata, resource page color scheme, and other visual and non-visual aspects of the resource pages.

The search results may also be visually associated with previous navigational sequences to provide quick access to a previous navigational experience. For example, a user can search for previously visited web pages resulting from a web search and the navigational sequences associated with the web search results will be displayed to allow the user to pick up where he or she left off.

Each visit to a resource page results in creation of a visit data structure that references (directly or indirectly) the resource page content and associated annotation data. Generally, a visit data structure references data associated with a previously visited resource page. A rich assortment of data may be recorded for each visited resource page, such as full text and layout data. In one embodiment, color aspects of each web page are stored to assist in a search. Resource page content may also be displayed in search results, such as a thumbnail image of the resource page. Furthermore, in contrast to typical browser session history lists, navigation branches are not truncated. Therefore, all previously viewed resource pages can be recorded in archive data storage (i.e., to the extent of an available or designated storage limit). Archived resource page content is indexed and annotated to be searchable by text, color, and other visual, audio, navigational, or metadata aspects, thereby allowing users to search the rich record of their browsing experience during the browsing session.

In implementations of the present invention, articles of manufacture are provided as computer program products. One embodiment of a computer program product provides a computer program storage medium readable by a computer system and encoding a computer program that searches a plurality of previously visited resource pages accessible via a network coupled to the computer system. Another embodiment of a computer program product may be provided in a computer data signal embodied in a carrier wave by a computing system and encoding the computer program that searches a plurality of previously visited resource pages accessible via a network coupled to the computer system.

The computer program product encodes a computer program for executing on a computer system a computer process for searching a plurality of previously visited resource pages accessible via a network coupled to the computer system. Visit data structures associated with each of the resource pages are recorded in archive storage. The visit data structures are annotated with information relating to at least one searchable characteristic of an associated resource page. A browser sessions search parameter is received specifying a targeted search characteristic. The visit data structures in archive storage are searched to identify at least one of the plurality of previously visited resource pages having the searchable characteristic that satisfies the browser sessions search parameter.

In another implementation of the present invention, a method of searching a plurality of previously visited resource pages accessible via a network coupled to the computer system is provided. Visit data structures associated with each of the resource pages are recorded in archive storage. The visit data structures are annotated with information relating to at least one searchable characteristic of an associated resource page. A browser sessions search parameter is received specifying a targeted search characteristic. The visit data structures in archive storage are searched to identify at least one of the plurality of previously visited resource pages having the searchable characteristic that satisfies the browser sessions search parameter.

In yet another embodiment of the present invention, a browser sessions search tool for searching a plurality of previously visited resource pages accessible via a network coupled to the computer system is provided. An archival storage stores visit data structures recorded in association with each of the resource pages. One or more annotations associated with one or more of the visit data structures specify at least one searchable characteristic of an associated resource page. A browser sessions search query interface receives a browser sessions search parameter specifying a targeted search characteristic. A browser sessions search result search identifies at least one of the plurality of previously visited resource pages having the searchable characteristic that satisfies the browser sessions search parameter.

These and various other features as well as other advantages, which characterize the present invention, will be apparent from a reading of the following detailed description and a review of the associated drawings.

DETAILED DESCRIPTION OF THE INVENTION

A browser sessions search tool allows a user to search through records of previously viewed resource pages, even across multiple browser sessions. Each visit to a resource page results in creation of a visit data structure that references the resource page content. A rich assortment of data is recorded for each visited resource page, such as full text and layout data. In one embodiment, color aspects of each resource page are stored to assist in a search, although other recorded resource page characteristics may additionally or alternatively include without limitation other visual, audio, navigational, or metadata aspects Resource page content may also be displayed in search results, such as in a thumbnail image of the resource page. Furthermore, in contrast to typical browser history lists, navigation branches are not truncated. Therefore, all previously viewed resource pages are recorded in archive data storage (i.e., to the extent of an available or designated storage limit). Archived resource page content are indexed and annotated to be searchable by text, color, and other visual, audio, navigational, or metadata aspects, thereby allowing users to search the rich record of their browsing experience during the browsing session.

Figure 1:
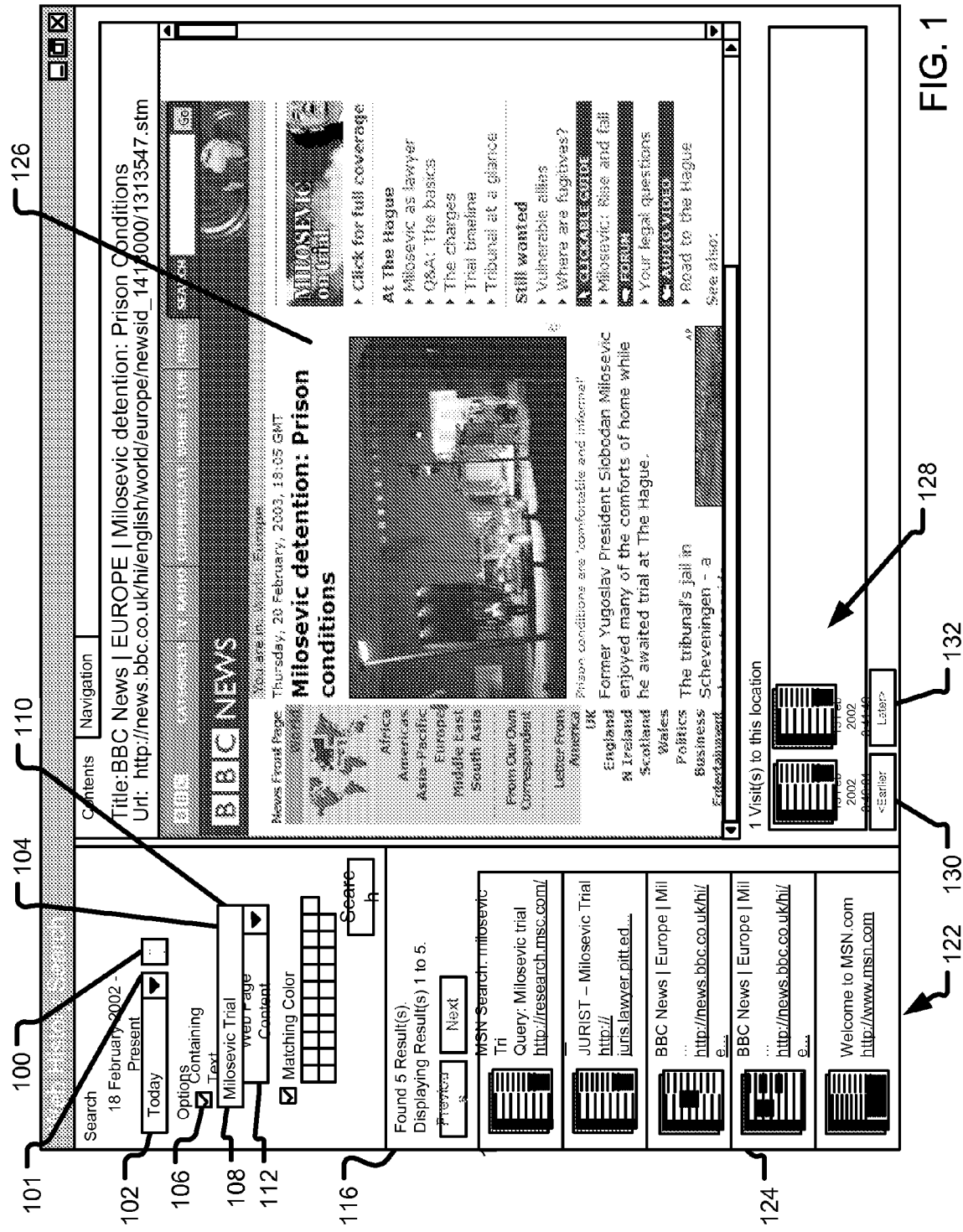
FIG. 1 depicts an exemplary user interface for a browser sessions search tool in an embodiment of the present invention.

FIG. 1 depicts an exemplary user interface for a browser sessions search tool in an embodiment of the present invention. A search period region 100 configures the time period over which previously visited web pages should be searched. A text box 102 provides a simple way of specifying common time periods, such as "today", "last week", "this month", etc. If more detailed and/or more complicated time periods are desired, the user can press a button 101 next to the text box 102, which opens a dialog box through which arbitrary dates/times may be input for either end of the desired time period. In alternative embodiments, the time period can be configured for distinct periods prior to the present date, for multiple periods, or with a finer granularity (e.g., down to the minute or hour).

An Options region 104 (i.e., a browser sessions search query interface) configures the search parameters. A check box 106 allows a user to specify a text search parameter for the search to locate in previously visited web pages. The text search parameter is specified in text box 108 and may include a natural language query or a Boolean type query with known logical operators, including AND, OR, quotes, wild cards, etc. A drop down box 110 allows a user to limit the portion of each web page to be searched. In the illustrated search, the "web page content" is specified. Therefore, a user can search the complete text body of the web page (e.g., the HTML of the document). However, other portions of the web page may also be searched, including link anchors, headings, captions, query terms associated with a search result page, etc., and whatever logical units (e.g., introductions, abstracts, reference lists, etc.) the resources pages may contain.

A check box 112 allows a user to specify a color for the search to locate in previously visited web pages. See also the discussion of FIG. 3. A user may not remember specific text from the sought-after web page, but may have a vague recollection of a color displayed on the web page or some other visual aspect of the web page. For example, a user may remember the background color of the web page or a particular color in an image or font. A search for a visual aspect of a sought-after web page allows a user to search based on an alternative search parameter, which may be applied in combination with or in place of the text search parameter. Other visual aspects may include without limitations frames, border colors, buttons and other controls and their colors, sizes, styles, etc.

In another embodiment, other visual aspects may additionally or alternatively be specified as search parameters. For example, a user may specify one or more locations or regions on the web page at which he or she remembers seeing the text, color, or other visual aspect. The location or regions may be specified by coordinates, coordinate ranges, frame identifiers, or other spatial parameters. In one embodiment, regions are specified by quadrants of the web page (e.g., Northeast, Northwest, Southeast, Southwest), although other regional specifications are contemplated within the scope of the present invention. In yet another embodiment, a user may additionally or alternatively specify an audio aspect as a search parameter. For example, a user may search for the previously visited web page having the combination of a blue animation and sound effects.

In yet another embodiment, non-visible and non-audio aspects of previously visited resource pages can be searched. Exemplary aspects include without limitation web search parameters associated with one or more web pages, the time of access, the resource page navigated from, the resource page navigated to, image labels, metadata, advertisements included within a resource page, forms, hyperlinks, web page titles, resource pages marked as favorites, and web pages pointed to by links previewed using the Hyperlink Preview Utility but not actually viewed in the main browser window.

The search button 114 initiates the search based on the currently set parameters. The search results region 115 (i.e., a browser sessions search results interface) displays the results 122 of the last search. In one embodiment, each search result includes a thumbnail image of the previously viewed web page, not a newly retrieved version of the web page. The search results region 115 also displays the title and address of the web pages resulting from the search. If more results are found than fit in the search results region 115, PREVIOUS button 118 and NEXT button 120 allow a user to traverse through multiple pages of search results. The currently selected result 124 ("the current result"), as indicated by the dark (red) border around the thumbnail image, is also displayed at a larger size in the "Contents" window 126. The visits region 128 displays the number of times the web page has been visited during the search period, along with date and time of each visit and a thumbnail image of each previously visited web page.

Figure 2:
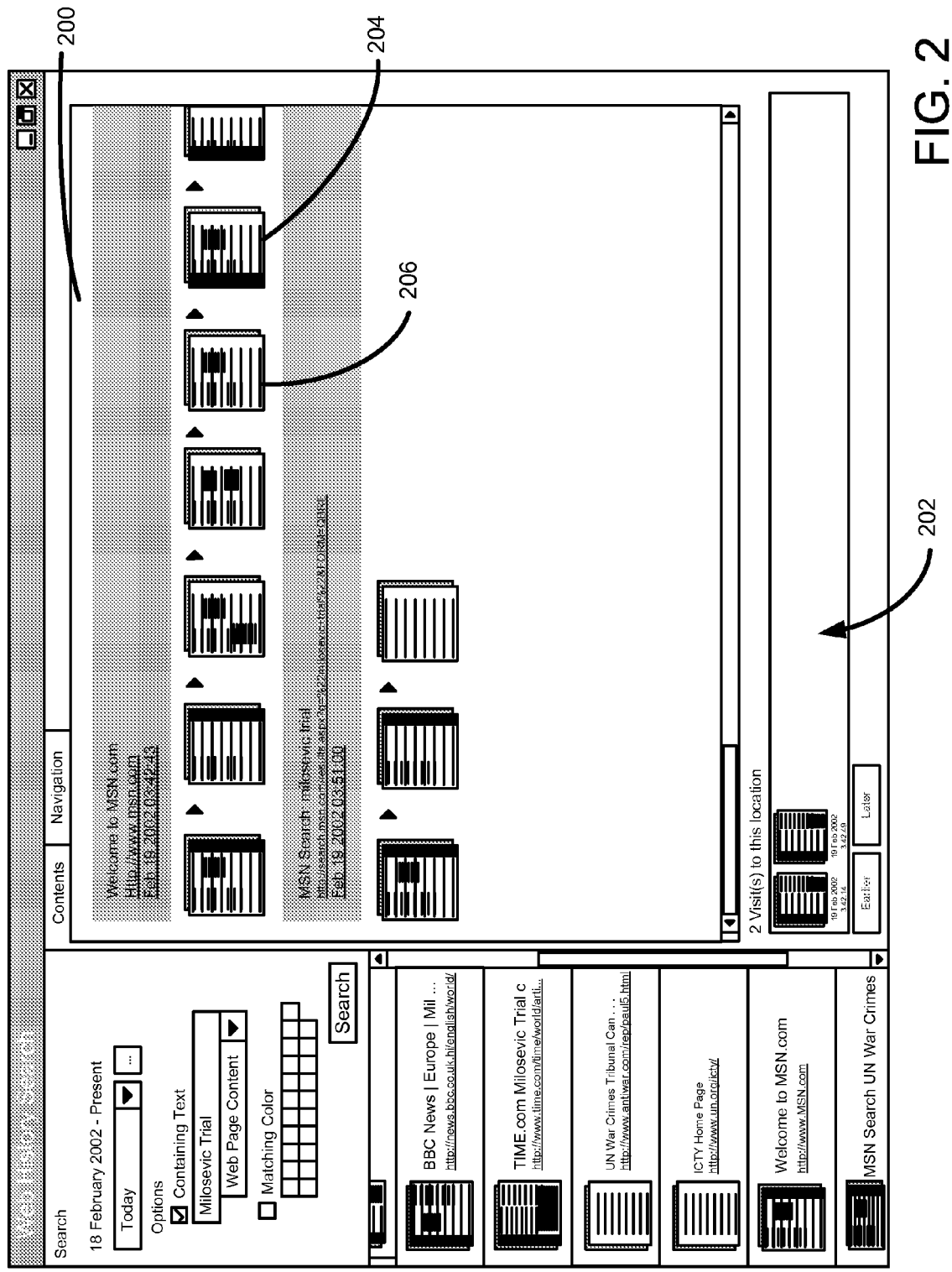
FIG. 2 also depicts an exemplary user interface for a browser sessions search tool in an embodiment of the present invention.

FIG. 2 also depicts an exemplary user interface for a browser sessions search tool in an embodiment of the present invention. The "Navigation" window 200 illustrates the navigation sequences associated with the web pages shown in the visits region 202. As illustrated, the currently selected search result 206 is shown in the navigation sequence 204. This feature allows a user to retrieve a desired previously executed navigation sequence from archive based on a target search characteristic on only one of the resource pages in the sequence.

Figure 3:
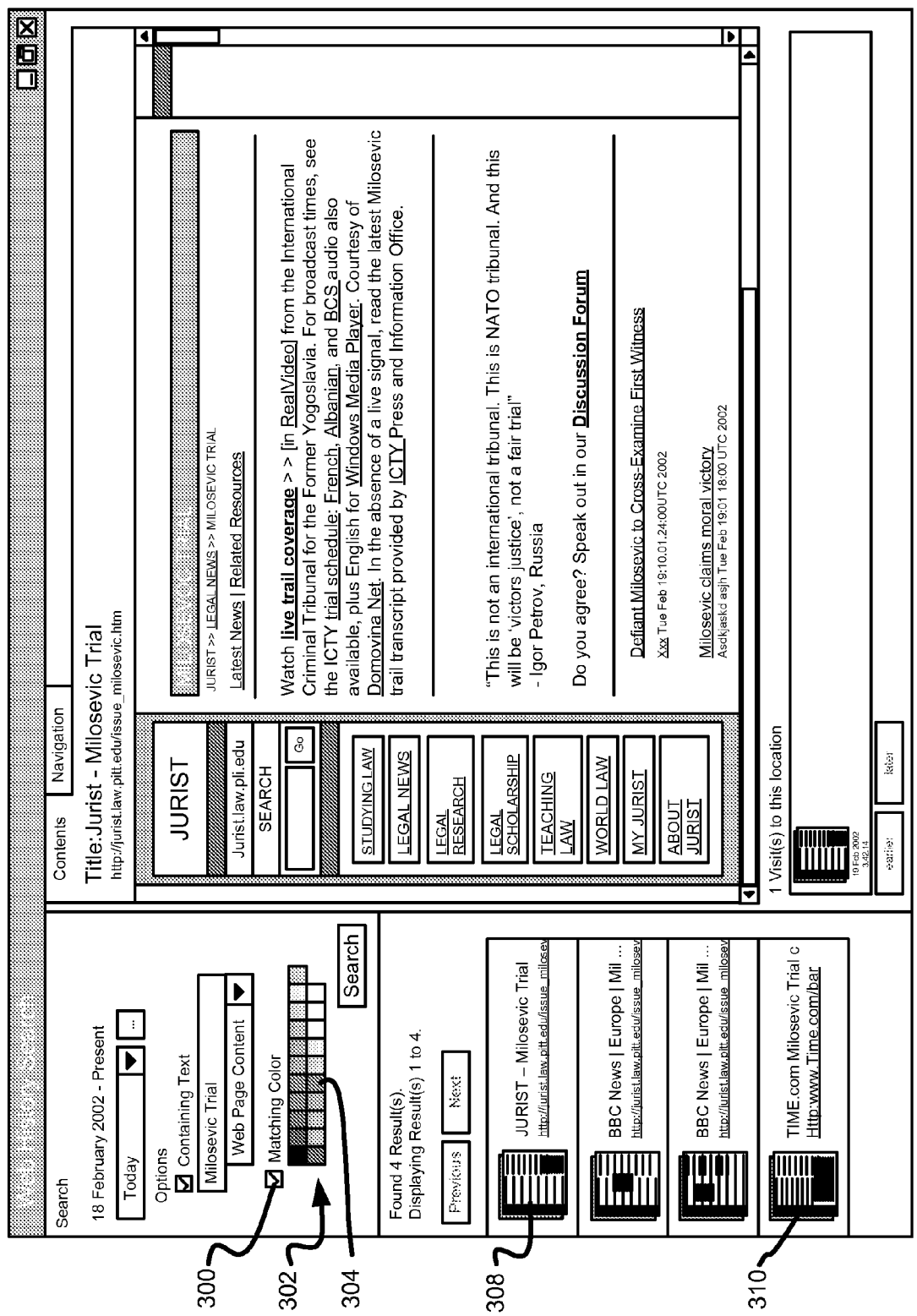
FIG. 3 depicts an exemplary user interface for a browser sessions search tool in an embodiment of the present invention.

FIG. 3 depicts an exemplary user interface for a browser sessions search tool in an embodiment of the present invention. As discussed previously, a checkbox box 300 allows the user to select a search based, at least in part, on a color, which may be selected from the colors 302. The color 304 is shown as selected for the current search. Search results 306 include previously visited web pages containing the color 304.

In one embodiment, a browser sessions search tool uses the color index of the previously visited web pages to find those that match the specified color 304. The web pages that contain the specified color are displayed in the search results region 306 in order, from the web page 308, the best match (e.g. the page with the greatest number of matching pixels) for the color search at the top of the search results region 306 to the web page 310, the lowest scoring page (e.g. the page with the lowest number of matching pixels) at the bottom of the search results region 306. The results of the color analysis can also be saved as an annotation of the visit data structure. In another embodiment, the color query specification and matching can be limited to specific locations or regions of each web page, such as the side bars, header, footer, etc. In one embodiment, the color analysis for each web page may be computed based on the color characteristics of the thumbnail image instead of the archived web page content. Alternatively, the color specification of the page may involve parsing the HTML code for color specifications of the page elements (e.g., backgrounds, fonts, tables, lines, etc.) and embedded images.

In yet another embodiment, a user may search previously visited web pages based on previous search queries, such as those search queries entered into a web search engine. For example, each archived web page associated with a web search may be annotated with the search parameters used in the search. Therefore, if a user performs two web searches (e.g., one based on "Monty Python" and the other based on "Monty Hall") and navigates through some of the results of each search, the user can at a later time perform a browser sessions search based on "Python" to display those web pages navigated from the results of the "Monty Python" web search. Moreover, the "depth of navigation" associated with such annotation may be configured by the user, such that a single web page or even a web trail (i.e., no longer than a specified depth) resulting from a given web search can be returned by the browser sessions search.

A user may also select a topic or specify a label in association with a displayed resource page. A topic identifier or label is then stored as an annotation with association with the data structure representing the visit (i.e., the visit data structure). In this manner, such annotations can also be searched by the browsers sessions search tool. For example, after performing a web search, a user can then rank the various search results as he or she reviews the web pages identified by the search results (e.g., from 1 to 10, with 10 being the most interesting). Thereafter, the user can search the user-specified labels (i.e., the rankings) of the previously viewed resource pages to consolidate the most relevant web pages.

For that purpose, a topic or label can be associated with a particular page (or, alternatively, a certain visit to a particular page), which is then stored as an attribute in a page data structure or a visit data structure. Several pages, visits, and/or sequences of visits can share the same label, and therefore constitute a "set" of pages or visits. For example, to "save" a page or set of pages, a user can label all desired pages using the same token. The label can then be used as a selector on which a user can search in the browser session search tool. That is, the search tool can search for the label in the annotations of the archived resource pages and visit data structures. The result list for this search is displayed to the user, who can browse through the list of resource pages.

It should be understood that the underlying data (e.g., annotations, content, etc.) collected or accessible by a browser sessions search utility also supports searches for groups of visits. For example, a user may search for all Web trails or browser session that contain resource pages having blue pixels. The individual visit data structures of a Web trail may be related and reconstructed through a trail identifier. Likewise, the individual visit data structures of a browser session may be related and reconstructed through a session identifier. As long as one resource page (or a configurable number of resource pages) within the trail or session satisfies the search criteria, the trail or session may be returned as a search result. As an alternative embodiment, trail or session level annotations may be recorded in the archive and shared among multiple visit data structures (e.g., by virtue of a reference from each visit data structure).

Figure 4:
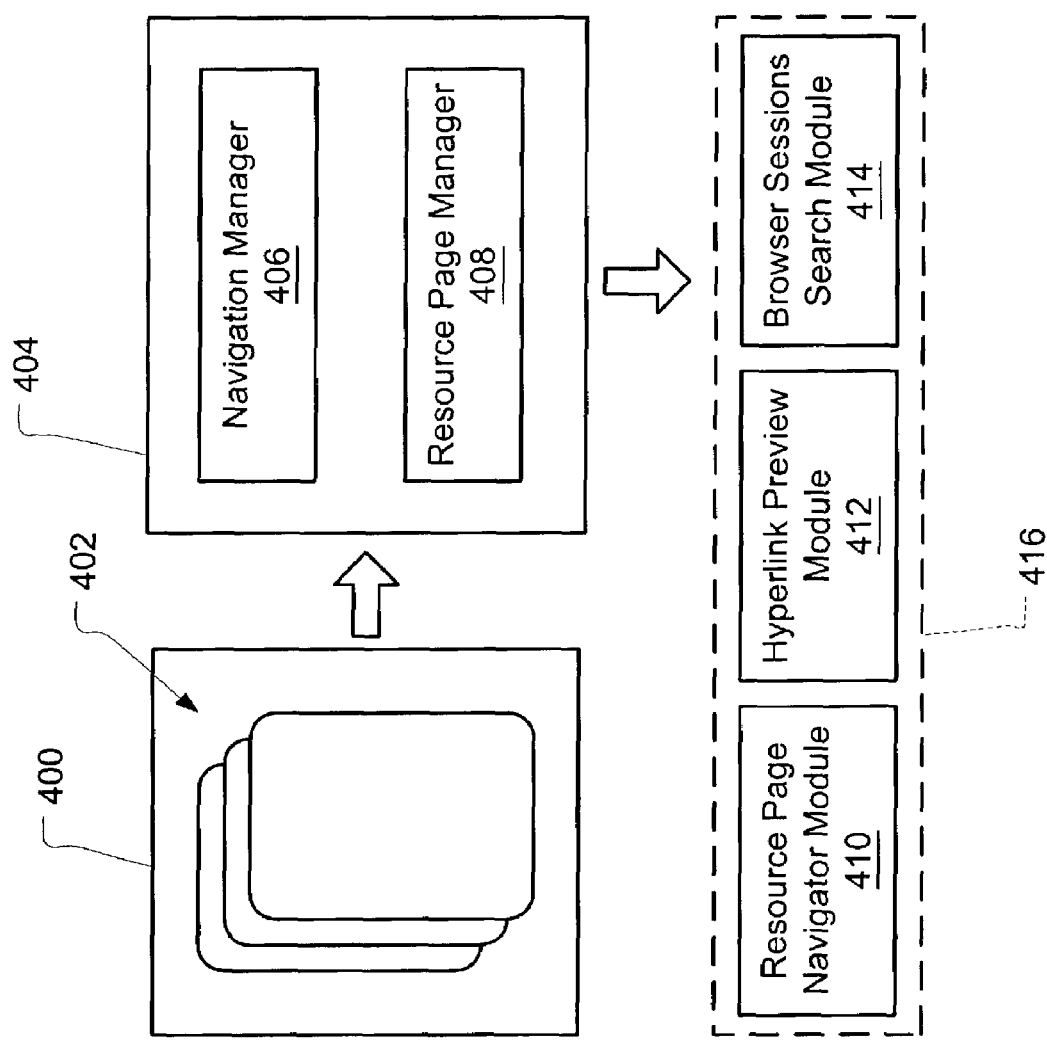
FIG. 4 depicts an architectural diagram of a browser session navigation tool in an embodiment of the present invention.

FIG. 4 depicts an architectural diagram of a browser sessions search tool in an embodiment of the present invention. A browser 400 (e.g., a web browser) displays resource pages 402 (e.g., web pages, files, directories, computers, etc.) in a main browser window. Browser and user interface events from active browser windows are communicated from the browser 400 to underlying services 404 to effect browser sessions search functionality.

One such service is a navigation manager 406, which creates and stores the rich record of a user's navigation during a browser session. In one embodiment, the navigation record includes information regarding navigation events and objects, including the type and time stamp of a navigation event, local and remote references to objects (e.g., URLs and local paths to of resource pages), and any metadata associated with the navigation (e.g., search queries, user annotations, device or environment specific parameters, etc.). The navigation record is stored, in part, for use in displaying various views (such as a trail or a map) of the navigation during a browser session.

Another such service is a resource page manager 408, which performs loading and analyses of the resource pages accessed through the browser 400. The types of analysis can include without limitation page layout analysis, text content processing, thumbnail image creation, and color scheme analysis. The resource page manager 408 also manages storage of archive data so that other modules 416 can access, further analyze, and present the analysis to the user in various forms. For example, a resource page navigator module 410 accesses the archive data to present the browser session navigation bar and/or map views to the user. The resource browser session navigation functionality is described in further detail in U.S. patent application Ser. No. 10/186,933 filed Jun. 28, 2002, entitled "NAVIGATING A RESOURCE BROWSER SESSION".

Another module may perform a thumbnail color analysis in a browser sessions search module 414 to allow a user to search a page with a specific color characteristic and/or another visual aspect. As the resource browser generates visit data structures for each visit to a resource page, each visit data structure may be annotated with the results of text analysis, color scheme analysis, layout analysis, natural language analysis, navigation analysis, metadata analysis, page elements analysis, and other types of resource page analysis. For example, as a result of one or more of these analyses, a user may use the browser sessions search module 414 to search for all previously visited resource pages navigated from a designated resource page containing a designated shade of the color red. See the discussion of FIG. 3 for more details of this kind of search.

Yet another module may include a hyperlink preview module 412 to allow a user to preview a web page associated with a hyperlink in a miniature preview window. Such functionality is described in further detail in U.S. patent application Ser. No. 10/187,160 filed Jun. 28, 2002, entitled "HYPERLINK PREVIEW UTILITY AND METHOD".

Figure 5:
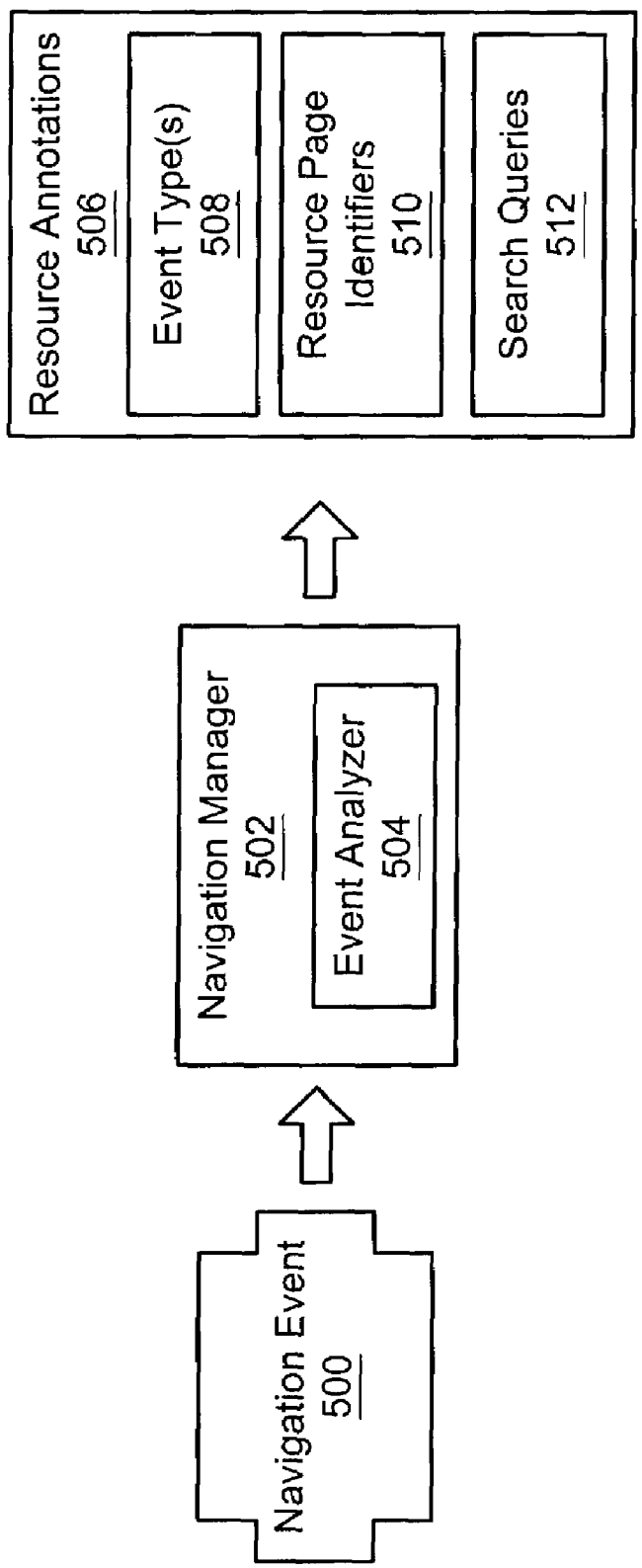
FIG. 5 illustrates functionality of a navigation manager in an embodiment of the present invention.

FIG. 5 illustrates functionality of a navigation manager in an embodiment of the present invention. A navigation event 500 is detected by the navigation manager 502 (e.g., receiving a navigation event in an event handler). In one embodiment, the navigation event 500 may include without limitation:

(1) a resource page access event caused by providing a URL for a resource (e.g., in an address bar);

(2) a resource page access event caused by selection of a hyperlink within the browser;

(3) a resource page access event caused by execution of a search query (e.g., via a search engine web page) or a request to access an on-line service (e.g., logging into a service site, etc.);

(4) a resource page access event caused by selection or execution of a hyperlink from another application (e.g., from an e-mail message or other document type);

(5) a resource page access event caused by selection of the Back/Forward navigation features in a browser; or (6) a resource page access event caused by selection of a resource identifier from a list of recently accessed resources (e.g., via a standard history list or Favorites list).

However, in one embodiment of the present invention, live navigation events result in addition of one or more new visit nodes in a trail or map, whereas non-live navigation events do not. For example, navigation events that result in an access to a live resource page, such as an execution of a link on a page, cause an addition of a new visit node to a trail or map. Similarly, an explicit HTTP (Hypertext Transfer Protocol) request for retrieving a live web page results in creating a whole new trail, including the requested page thumbnail as the first node. In contrast, using the back/forward features of a browser to traverse through previously visited nodes results in access to an archived (non-live) resource page and, therefore, does not result in an addition to a trail or map. In another embodiment, when a back/forward feature is used to traverse to a previously visited node and the user executes a live navigation from the previously visited node to a new node, both a duplicate of the previously visited node and the new visit node are added to the trail, but only the new node is added to the map, on a new branch. Furthermore, if the user accesses an archive page in one of the previous trails and navigates away by executing a link on the archived page, a new trail is started by creating the reference (a thumbnail image) of the revisited page and the newly accessed page. In yet another embodiment, all navigation events result in additions to the trail, even those caused by archive retrievals.

When an event is triggered or accompanied by a web search query or a user selected topic, that event is analyzed by an event analyzer 504 and the corresponding resource page (e.g., the search result page and/or the search engine page) is annotated by the query or the topic to facilitate revisiting of the search result page or the resource page associated with the topic. For example, a page may be annotated (see event annotations 506) with one or more relevant event types 508, including without limitation: hyperlink selection, open in new window, form submission (which includes a query), back/forward, selection from favorites, selection from history, selection from address bar list, browsing to a URL typed into the address bar, pop-up windows, and auto-refresh. Furthermore, a page may also be annotated with resource page identifier(s) 510 (e.g., a URL, a user-selected topic or a user specified label) or web search query terms 512 corresponding to either the page or the event. It should be understood that FIG. 5 merely shows exemplary resource annotations and that other annotations are contemplated within the scope of the present invention.

Figure 6:
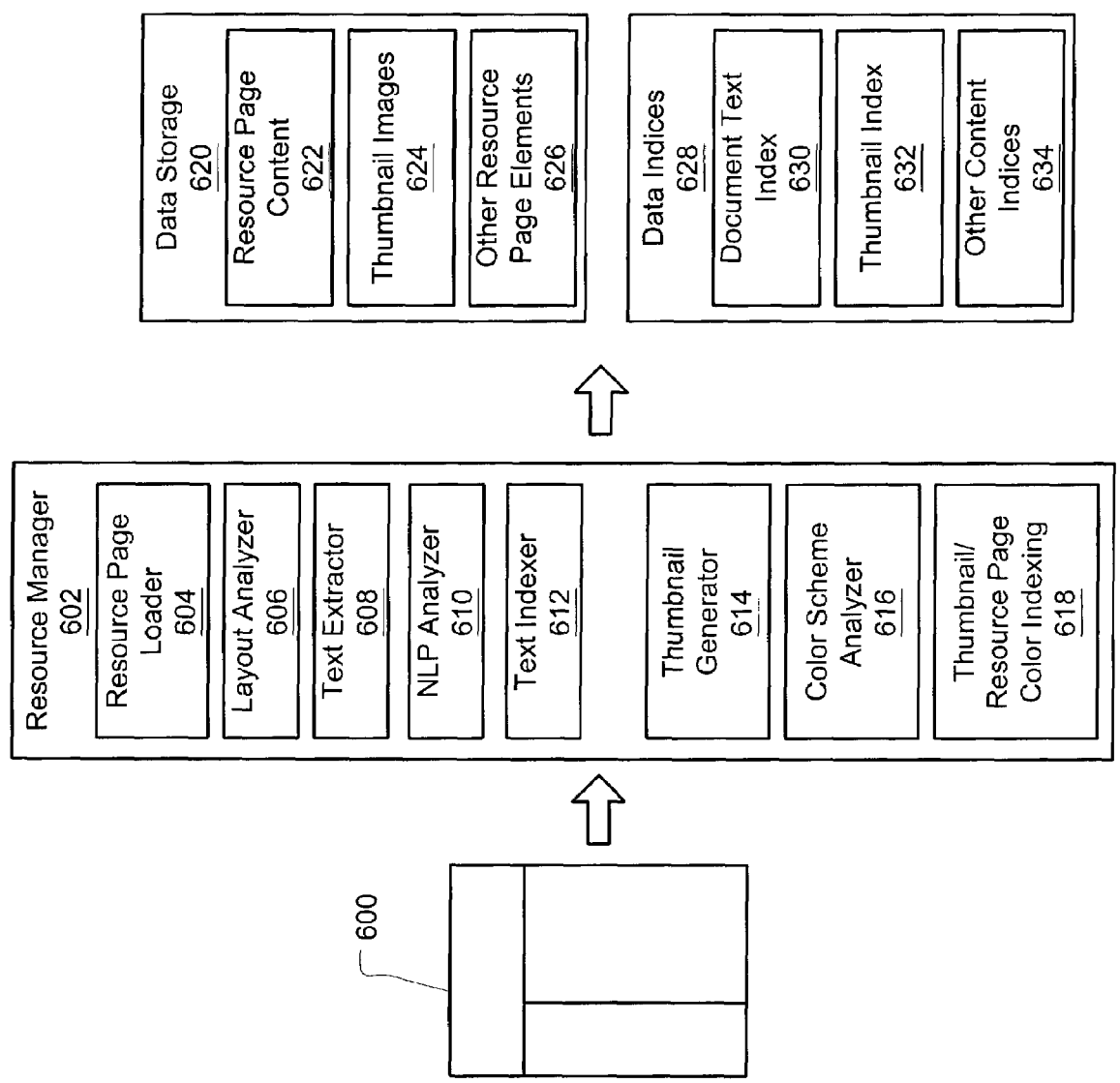
FIG. 6 illustrates functionality of a resource page manager in an embodiment of the present invention.

FIG. 6 illustrates functionality of a resource page manager with respect to the accessed resource page content in an embodiment of the present invention. When a resource page 600 (depicted as a web page having three component web documents separated by frames) is received by the browser, the resource page includes at least one resource page identifier and a time stamp. In the exemplary resource 600, the three component documents are identified by individual URLs. A resource page manager 602 processes resource pages that are loaded by the browser, using one or more internal modules to accomplish such processing.

A resource page loader module 604 captures a view of the resource page 600, storing the resource page content, including multiple documents of multi-frame page layouts, into the resource page content portion 622 of the data storage 620. See the exemplary visit and page data structures of FIG. 9 for more detail.

A layout analyzer module 606 analyzes and stores various logical components of the resource page (e.g. component images and links associated with banner advertisements). The layout analyzer module 606 identifies characteristics of the document and object within the document that would be exposed to a user (such as elements that the user can search or view independently). The layout analyzer module 606 analyzes the layout of the viewed resource page and the geometric characteristics of the rendered display of the resource page. For some web pages, for example, the layout analyzer module 606 analyzes the HTML document object model (DOM). The analysis determines the logical structure of the resource page, including the identification of elements that the user may wish to search on or browse through, such as titles, menus, advertisements, images, hyperlink anchor text, etc.

A text extractor module 608 extracts the text from the resource page 600 using known lexographical and parsing techniques. A natural language processing (NLP) analyzer module 610 examines the extracted text and may include one or more linguistics tools, ranging without limitation from a simple stemming tool to a deep syntactic and semantic analysis tool, depending on the performance requirements (i.e., speed and accuracy). For example, for simple highlighting of text in a document, segmenting text into sentences and words may be sufficient. In contrast, for summarizing a document, a complete syntactic and semantic analysis may be applied. Text analysis results may be persisted in the resource page content portion 622 of data storage 620, such as metadata in XML (eXtensible Markup Language), a new web publishing format, or even a more general publishing format.

The extracted text is indexed by a text indexing module 612, which stores information about the resource page that will be used for retrieving the document. In one embodiment, indexing for standard information retrieval (IR) is employed, although in another embodiment, additional features are implemented. For example, indexing is performed to take into account the structure and logical units of the document content, such as indexing on the anchor text of the hyperlinks, URLs, image captions, headings, etc. The text indices are stored in the document text index portion 630 of the data indices storage 628 to facilitate text searching and resource page retrieval. Generally, the type of index is determined by the type of resource in use. For example, if a resource is a structured set of equipment, an appropriate index may consist of a simple list of resource identifiers and equipment names or similar user-recognizable labels.

A thumbnail generator module 614 creates a thumbnail image from the resource page 600 and stores the thumbnail image in the thumbnail images portion 624 of the data storage 620. The thumbnail generator module 614 captures the image rendered by the browser. Thumbnail images may be created by capturing a snapshot image from the browser contents, which is then scaled down to an appropriate thumbnail size by computing for every thumbnail pixel an average color for the corresponding region of the original browser snapshot image.

A color scheme analyzer module 616 analyzes the thumbnail and/or color scheme of the resource page 600. Color schemes of the resource page 600 can be captured by analysis of the resource page representation. For example, if the resource page 600 is a web page, the color scheme can be captured by analysis of the HTML document that defines the web page, such as by identifying HTML color parameters associated with the font, page background, table background, etc., by counting the number of pixels of each color in a given region of the web page, or by other methods.

A thumbnail/resource page color indexing module 618 indexes the analyzed thumbnail and/or color schemes and stored the indices in the thumbnail image index portion 632 and the other content indices portion 634 of the data indices storage 628 to facilitate searching. Other The color information extracted by the color scheme analyzer module 616 is stored in a searchable index, where a search may be conducted by "query by example" or filtering of the result based on the position of the search color on the resource page. For example, if the user remembers that a dark green banner advertisement was located at the top of a previously viewed web page, the user may search for the dark green color at the top of a web page, based on appropriate search criteria input.

Other indices that may be relevant are stored in the other content indices portion 634 and may include the time when the trail or browser session began, the time when the trail or browser session ended, the number of pages included in the trail or browser session, the set of distinct URLs in the trail or browser session, queries submitted during the trail or browser session, etc. Accordingly, by associating a query with an entire trail or browser session, a user could find all trails or browser sessions with searches on "mobile phones", for example.

Figure 7:
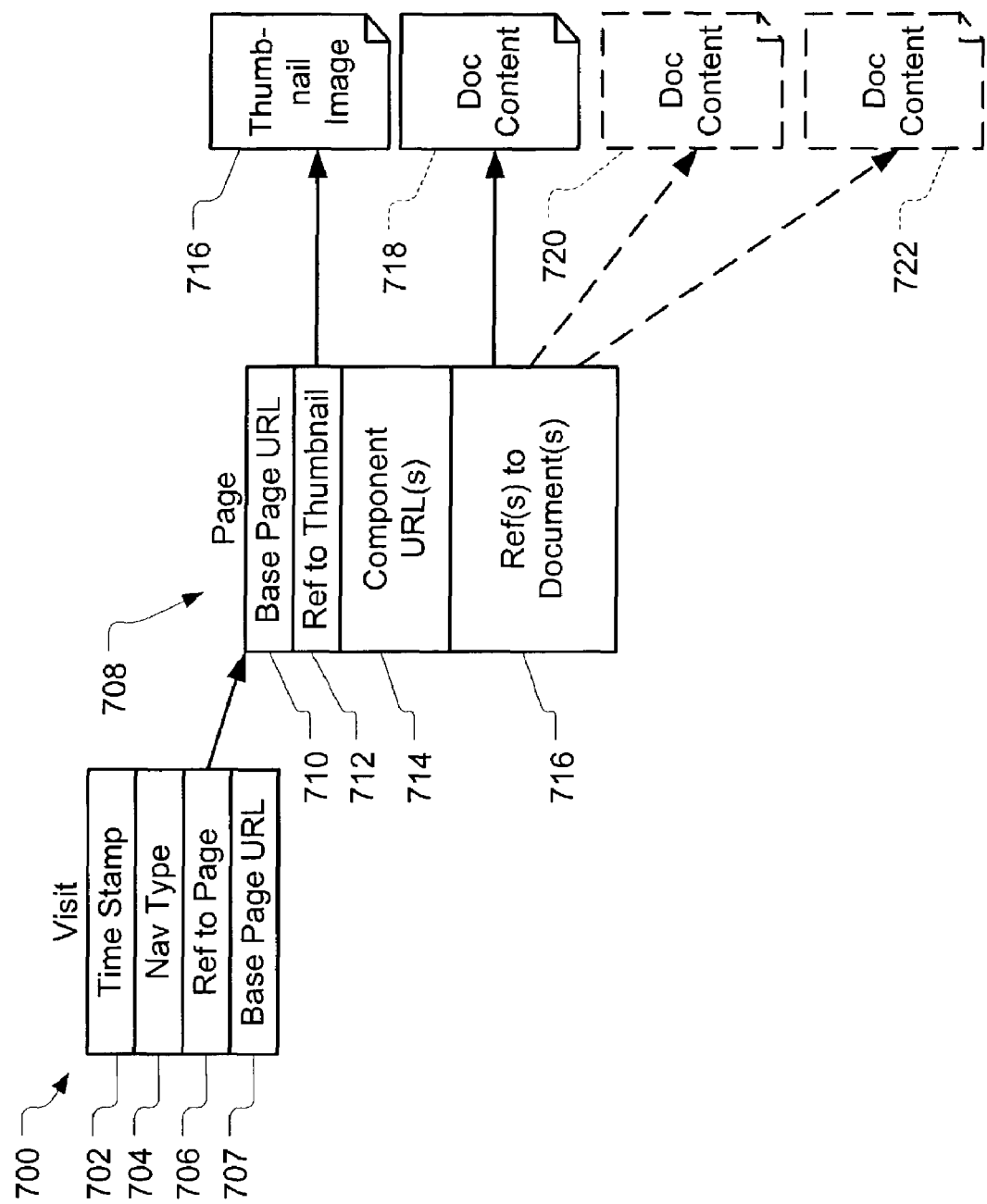
FIG. 7 illustrates a resource data view of a visit in an embodiment of the present invention.

FIG. 7 illustrates an exemplary resource data view of a visit in an embodiment of the present invention. A visit data structure 700 represents a visit node in a trail or a map. For each navigation event that results in a visit node, a visit data structure 700 is created and added to the trail or map. A time stamp value 702 specifies the time the navigation event was detected. The "nav type" value 704 specifies the type of navigation event (e.g., back, forward, hyperlink, URL entry, etc.). Note: "Nav types" are described as "event types" with regard to the discussion of FIG. 5. On the basis of these Nav types, navigation sequences associated with a given visit data structure may be dynamically reconstructed. A "ref to page" value 706 specifies a reference (e.g., pointer) to a page data structure (such as page data structure 708) that defines the resource page visited.

In one embodiment, a unique visit identifier 707 is also stored in the visit data structure 700. A unique visit identifier incorporates a signature that uniquely identifies the contents of the accessed resource page and is relevant in cases when the resource changes with time and the storage of the newly retrieved, if only slightly changed, resource page content is required. The signature is used to verify whether the whole accessed page or any component thereof has previously been retrieved and stored in the archive for reuse. A unique signature is generated for each archived resource page, or for individual constituent parts of each resource page. Comparison of content signatures enables optimization of the storage space and archive management (e.g., by eliminating pages or constituent parts thereof that were previously accessed and archived but do not significantly differ from the resource page target of the current navigation request). Exemplary signatures may include without limitation time stamps, hash keys, encryption keys, or serialized forms of such resources and constituent parts.

In the page data structure 708, a base page URL value 710 specifies the location of the resource page (note that the URL value may, for example, also specify a pathname in a local file system). The base page URL value 710 identifies the resource page location. A "ref to thumbnail" value 712 references a thumbnail image 716, which is displayed in the visit node of a trail of the browser session navigation bar or a tree of the browser session navigation map. In one embodiment, the reference to the thumbnail image 716 is a local pathname into the thumbnail content portion of the archive data storage. References to such resource pages, resource page locations, and thumbnail images allow the tool to reuse duplicative data storage. For example, repeated visits to the same web site can result in the reuse of the archived web page content, URL, and thumbnail image, merely by referencing the existing archive storage for these elements.

If there are multiple resource documents in the base resource page (e.g., in a multi-frame web page), the component URL values 714 are listed in the page data structure 708. The component URL values 714 specify the location(s) of the component resource document(s) of the resource page. The page data structure also includes one or more references 716 to the base resource document storage 718 and component resource document stores 720 and 722. It should be understood that document content stores 720 and 722 are shown using dashed lines to indicate that, in some configurations, only a single document content storage is referenced. In one embodiment, the references to the document content stores 716, 720, and 722 are local pathnames into the resource page content portion of the archive data storage.

Each visit data structure is navigationally related with other visit data structures, as indicated by the "nav type" value 704. The visit data structures are stored in a set of visit data structures for a browser session, such as in a linked list. In addition, a new visit data structure is added to the set of visit data structures upon each navigational event, although for non-live retrievals, a new page data structure need not be created. Instead, a new visit data structure is created and added to the list of visits in the browser session, and the new visit data structure merely references the previously retrieved page data structure. Furthermore, creation of a new visit data structure does not require creation of a new visit node in either the browser session navigation bar or the browser session navigation map.

Moreover, it is also common for one document in a multi-frame page to change without other documents in the same page changing. For example, by selecting a bookmark in a table of contents of one frame, the document in the other frame may change to display the selected chapter. In such circumstances, a new visit data structure and a new page data structure are created, but the unchanged component document content stores (e.g., the table of contents document) are merely referenced by the new page data structure without duplicating the document content storage. The changed component document content, however, is created by the resource page manager, stored in the resource page content portion of archive data storage, and referenced from the new page data structure.

Each visit node may be annotated in a variety of ways. For example, annotations may be stored in or referenced from fields of the visit data structure (fields not shown). However, page content and annotations associated with a given visit may be shared with other visits. Therefore, annotations may also be stored in or referenced from the page data structure.

Annotations can be created and stored on many different levels, including without limitation at a visit level, with any constituent part of the resource content associated with the visit, at a page level (i.e., the Web location referred to by the URL), with a sequence of pages (e.g., a trail or other derived sequence or set of pages), and at a session level (e.g., in association with an identified browser session). Visual representations (e.g., thumbnails) and content analysis results relating to a resource are represented as annotations on the visit level, although other levels are also contemplated within the scope of the present invention. Such annotations may be stored in the visit data structure or directly in the data structures associated with services that use these annotations (e.g., into a searchable index of the various search services). With such storage, in one embodiment of the present invention, the logical connection with the visit is maintained via URL and the time stamp, although other logical connections may be employed within the scope of the present invention.

Figure 8:
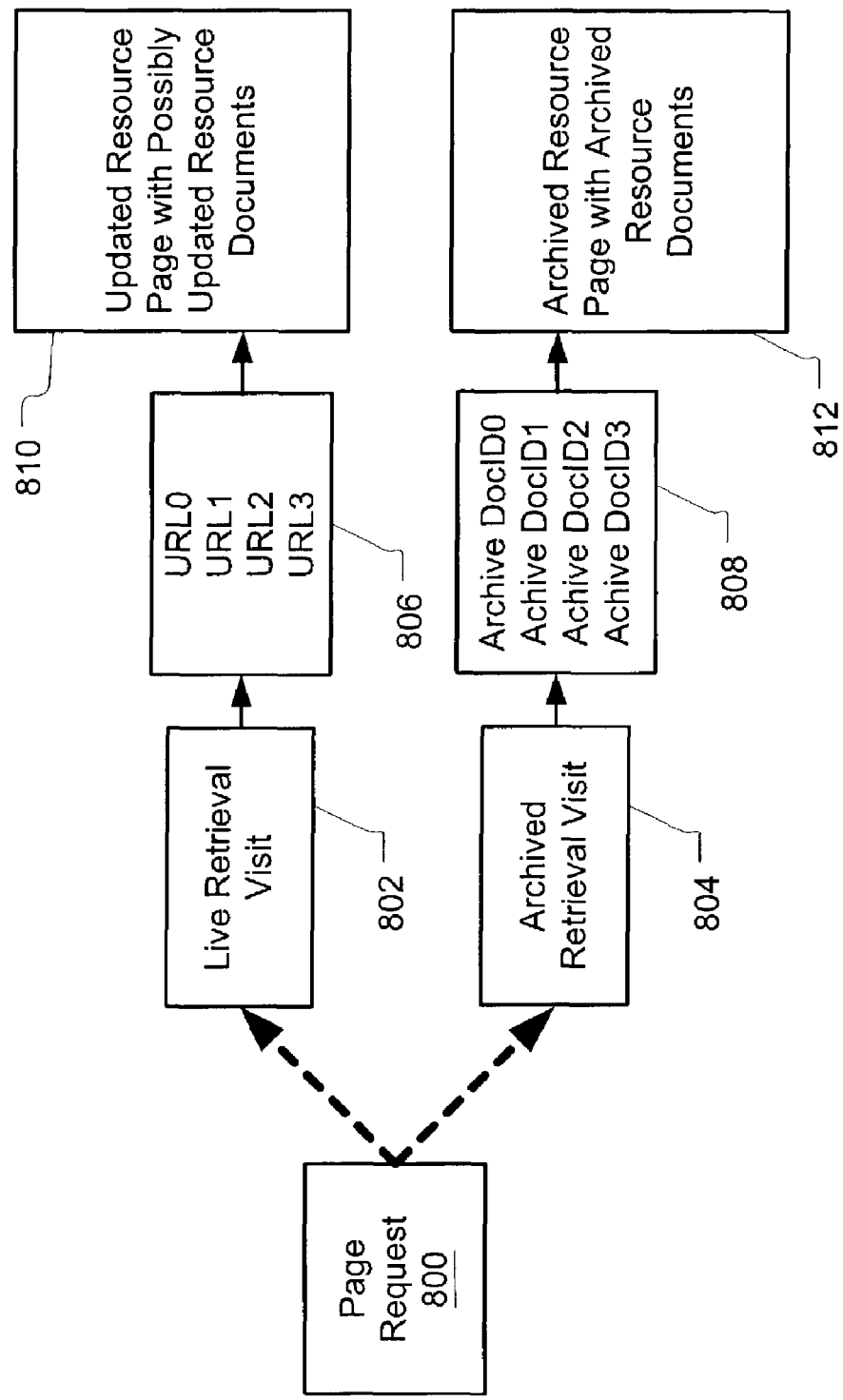
FIG. 8 illustrates two exemplary requests for a resource page in an embodiment of the present invention.

FIG. 8 illustrates two exemplary requests for a resource page in an embodiment of the present invention. A page request 800 is a navigation event requesting a resource page. In a first example, the request 800 results in a live retrieval of the resource page. Accordingly, a visit data structure 802 for a live retrieval visit is created and populated having a time stamp for the event, a nav type value and a reference to a page data structure 810.

In the one implementation, the navigation information is captured and managed by the navigation manager and stored separately from the visit information. The logical correspondence to the visit data in maintained via URL and time stamp. An alternative embodiment stores navigation information within the visit data structures. Furthermore, navigation sequences, such as trails, are derived by analyzing the navigation record and may be created on demand. Alternatively, a navigation sequence may be stored for efficient presentation to the user, such as in associations or sequences of visit data structures or references to visit data structures.

In addition, stored navigation sequences may be annotated by the user, so as to label or bookmark the sequence for later recall. For example, a stored navigation sequence may be labeled "My Financial Page Review" and be stored or bookmarked. Thereafter, the user can recall the sequence to examine the archived information in greater detail. Alternatively, the user can annotate the sequence such that the order and pages of the sequence is preserved, but the content of each page is updated with a live retrieval. Stored navigation sequences can be edited (i.e., deletion of a visit) and re-saved under a different sequence identifier or label. Saved sequences may also be emailed (e.g., by attachment) to other users.

As a live retrieval, the resource page is retrieved from its resource location based on the base URL (e.g., URL0), which was specified in the page request 800 (e.g., by a hypertext link selection, by an HTTP request submission that generates a result page URL, etc.). In an alternative embodiment, the resource page manager may determine that the requested live resource page is unchanged from a previous visit, although this functionality is configurable. Page signatures may be used to determine if the resource page has changed. If the resource page manager determines that the base resource document is unchanged from a previous visit, the reference to the base resource document in the page data structure 810 merely points to the previous instance of the resource page document in the archive data storage. Otherwise, the newly retrieved base resource page document is recorded in the archive and referenced by the page data structure 810 in the archive, which is in turn referenced by the visit data structure 802. In one embodiment, the page data structure 810 references the base resource page document using document identifiers (e.g., DocID0), which may take various forms, including without limitation file system path names or Globally Unique Identifiers (GUIDs). If the base URL specifies only the document in the requested resource page, then no component resource documents need to be processed or stored in the page data structure 810.

If the base URL specifies a resource document having component resource documents, then the page loader also retrieves the component resource documents based on the component URLs (e.g., URL1–URL3) specified in the resource document of the base URL. Again, the resource page manager may determine that the live component resource documents are unchanged from a previous visit, although this functionality may be configurable. If the resource page manager determines that one or more of the component resource documents are unchanged from a previous visit, references to the component resource documents merely point to the previous instance of the component resource documents in the archive data storage.

The resource page manager generates a thumbnail image of the resource page (including the base resource document and any component resource documents), stores the thumbnail image in the thumbnail images portion of the archive data storage, and inserts the reference to the thumbnail image into the page data structure 810.

In contrast, if the request 800 results in retrieval of a resource page from the archive, there may be no need for a live retrieval of any resource. For example, a user may use the Back feature to return to a previously viewed resource page in a navigation sequence. Accordingly, a visit data structure 804 for an archived retrieval visit is created and populated as a near duplicate of the previously created visit having its own time stamp for the new visit event, its own Nav type value (e.g., "BACK"), and a duplicated reference to a page data structure 812. As an archived retrieval, the resource page documents are merely referenced in the archive. In one embodiment, the page data structure 812 references a base archived resource document using a base document identifier (e.g., DocID0). Likewise, any component resource documents are also referenced from the page data structure. The thumbnail image of the resource page (including the base resource document and any component resource documents) are also referenced from the page data structure 812.

Figure 9:
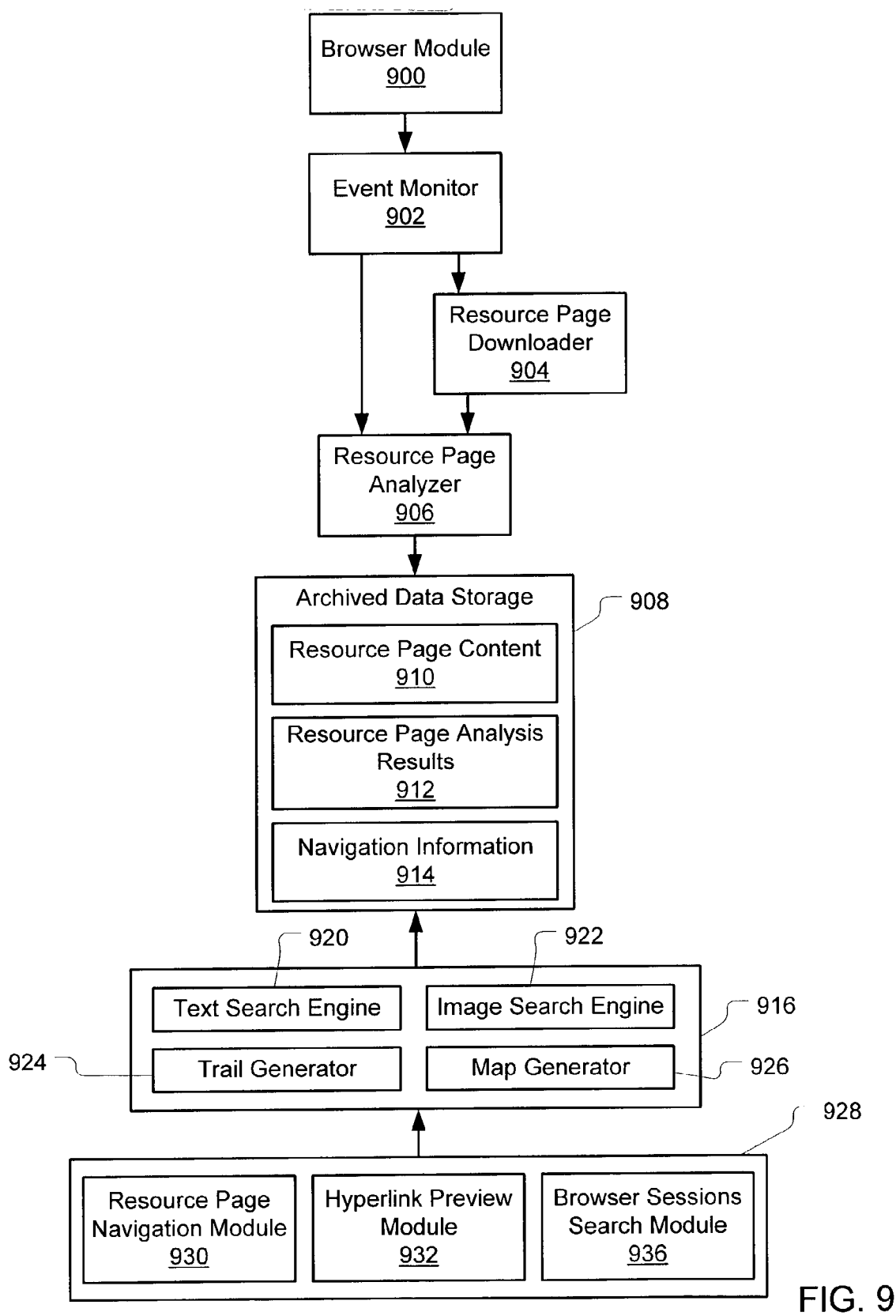
FIG. 9 illustrates processes and services of a browser session navigation tool in an embodiment of the present invention.

FIG. 9 illustrates processes and services of a browser session navigation tool in an embodiment of the present invention. A browser module 900 receives user input or network communications that result in a navigation event. An event monitor 902 in the navigation manager detects the navigation event. If the browser is invisible, the resource page associated with the navigation event is downloaded by the resource page downloader 904 before page analysis by the resource page analyzer 906. Otherwise, if the browser is visible, page analysis is performed without downloading by the resource page downloader 904. Note: in one embodiment, an "invisible" browser is used in the implementation of thumbnail creation, although in other embodiments the use of "invisible" browsers may not be required.

The resource page analyzer 906 in the resource page manager captures the resource page content and creates a thumbnail image for use in a navigation bar or map. In addition, the resource page analyzer 906 is also capable of performing layout and logical structure analysis, which can be used in history searches.

The event monitor 902 and the resource page analyzer 906 store the resource page content, various resource identifier, the thumbnail image, various indices, analysis results, and navigation event information in the archived data storage 908. The resource identifiers, resource page content and thumbnail images are stored in the resource page content portion 910 of the archived data storage 908. The indices and other analysis results are stored in the resource page analysis results portion 912 of the archived data storage 908. The navigation event is stored in the navigation information portion 914 of the archived data storage 908.

Several services 916 can access the archived data storage 908 to service features 928, such as a resource page navigation module 930, a hyperlink preview module 932, and a browser sessions search module 934. Each feature 928 uses the one or more services 916 to obtain browser session navigation information. A text search engine service 920 processes text search queries from the resource page navigator module 930 and the browser sessions search module 934. Likewise, an image search engine service 922 processes color and visual aspect search queries from the resource page navigator module 930 and the browser sessions search module 934. A trail generator 924 processes and provides data for display of visit trails. A map generator 926 processes and provides data for display of visit trees.

Figure 10:
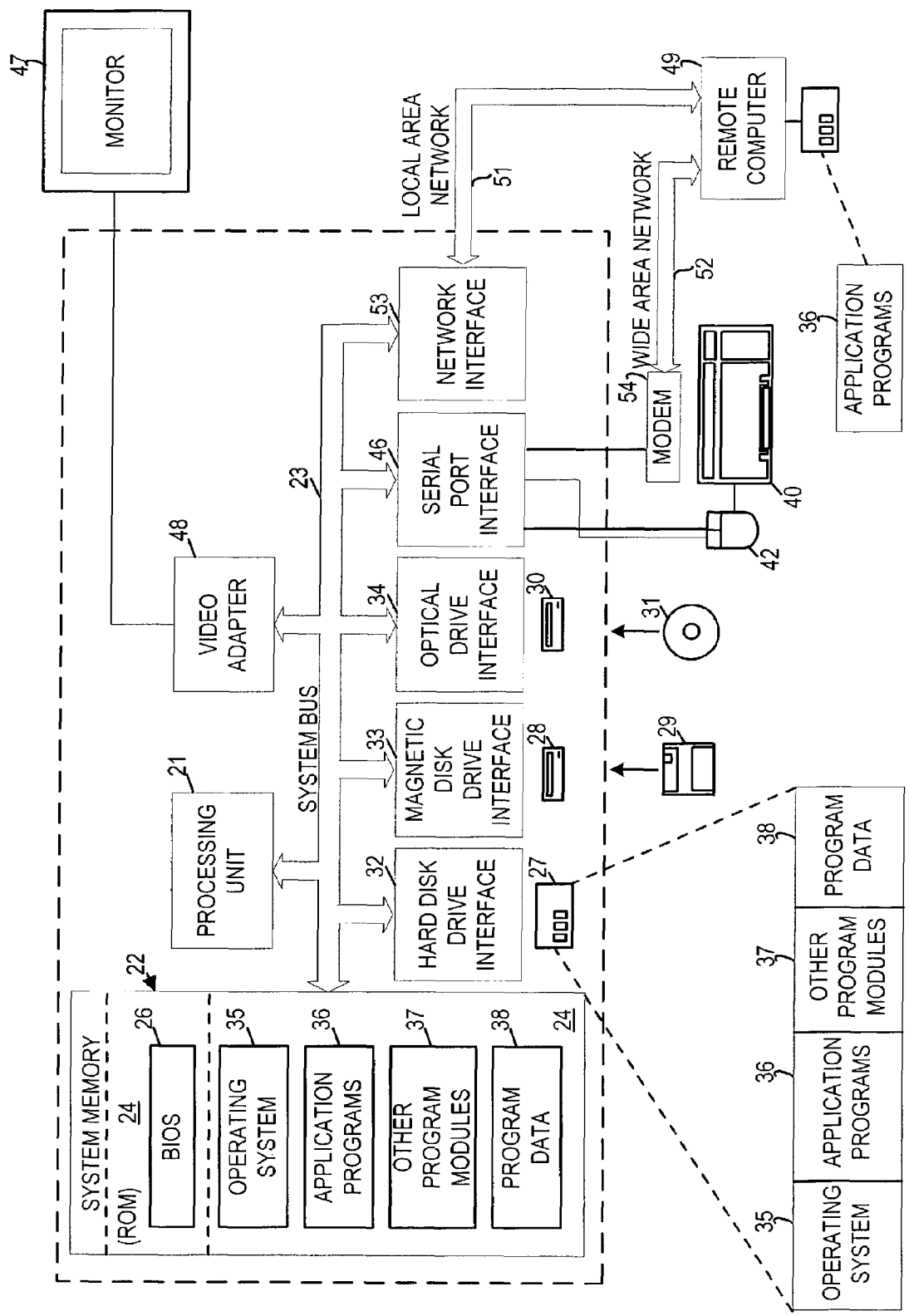
FIG. 10 illustrates an exemplary system useful for implementing an embodiment of the present invention.

The exemplary hardware and operating environment of FIG. 10 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/ output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a browser session navigation tool of the present invention, including the resource page manager, the navigation manager, the resource page navigator module, the browser sessions search module, and the hyperlink preview module may be incorporated as part of the operating system 35, application programs 36, or other program modules 37. The visit data structures, page data structures, and content data stores associated with the navigation tool may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A tangible storage medium storing a computer program for executing on a computer system a computer process for searching a plurality of previously visited resource pages accessible to the computer system, the computer process comprising:
   recording a visit data structure associated with each of the resource pages, the visit data structure being recorded in archive storage;
   annotating one or more of the visit data structures with information relating to at least one searchable characteristic of an associated resource page, the information including at least a navigation sequence identifying a previously viewed resource page;
   receiving a browser sessions search parameter specifying a targeted search characteristic; and
   searching the visit data structures in archive storage to identify at least one of the plurality of previously visited resource pages having the searchable characteristic that satisfies the browser sessions search parameter.

2. The tangible storage medium of claim 1 wherein the annotating operation comprises:
   storing the information in the one or more visit data structures.

3. The tangible storage medium of claim 1 wherein the annotating operation comprises:
   referencing the information from the one or more visit data structures.

4. The tangible storage medium of claim 1 wherein the annotating operation comprises:
   storing the information in a page data structure referenced by the one or more visit data structure.

5. The tangible storage medium of claim 1 wherein the annotating operation comprises:
   referencing the information from a page data structure referenced by the one or more visit data structures.

6. The tangible storage medium of claim 1 wherein the searchable characteristic relates to color displayed in the associated resource page.

7. The tangible storage medium of claim 1 wherein the searchable characteristic relates to location of a visual characteristic of the associated resource page.

8. The tangible storage medium of claim 1 wherein the searchable characteristic relates to an audio characteristic of the associated resource page.

9. The tangible storage medium of claim 1 wherein the searchable characteristic relates to a navigational relationship of the associated resource page.

10. The tangible storage medium of claim 9 wherein the navigational relationship identifies a resource page following the associated resource page in a navigational sequence.

11. The tangible storage medium of claim 9 wherein the navigational relationship identifies a resource page preceding the associated resource page in a navigational sequence.

12. The tangible storage medium of claim 1 wherein the searchable characteristic relates to a metadata characteristic of the associated resource page.

13. The tangible storage medium of claim 1 wherein the searchable characteristic relates to content of the associated resource page.

14. The tangible storage medium of claim 1 wherein the searchable characteristic relates to one or more web search parameters associated with the resource page.

15. The tangible storage medium of claim 1 wherein the computer process further comprises:
   receiving a browser event resulting in a visit to a resource page; and
   retrieving the resource page from one of a network and the archive storage.

16. The tangible storage medium of claim 1 wherein the computer process further comprises:
   displaying identifying information relating to the at least one of the plurality of previously visited resource pages that satisfy the browser sessions search parameter.

17. The tangible storage medium of claim 1 wherein the computer process further comprises:
   displaying a navigational sequence associated with the at least one of the plurality of previously visited resource pages that satisfy the browser sessions search parameter.

18. The tangible storage medium of claim 1 wherein an annotation resulting from the annotation operation is shared by a plurality of the visit data structures.

19. The tangible storage medium of claim 18 wherein the plurality of visit data structures are designated as being in a same Web trail.

20. The tangible storage medium of claim 18 wherein the plurality of visit data structures are designated as being in a same browser session.

21. The tangible storage medium of claim 1 wherein the computer process further comprises:
   returning as a search result a Web trail including at least one visit data structure referencing a resource page that satisfies the browser session search parameter.

22. The tangible storage medium of claim 1 wherein the computer process further comprises:
   returning as a search result a browser session including at least one visit data structure referencing a resource page that satisfies the browser session search parameter.

23. A method of searching a plurality of previously visited resource pages accessible to a computer system, the method comprising:
   recording a visit data structure associated with each of the resource pages, the visit data structure being recorded in archive storage;
   annotating one or more of the visit data structures with information relating to at least one searchable characteristic of an associated resource page, the information including at least a navigation sequence associated with the associated resource page;
   receiving a browser sessions search parameter specifying a targeted search characteristic; and
   searching the visit data structures in archive storage to identify at least one of the plurality of previously visited resource pages having the searchable characteristic that satisfies the browser sessions search parameter.

24. The method of claim 23 wherein the annotating operation comprises:
   storing the information in the one or more visit data structures.

25. The method of claim 23 wherein the annotating operation comprises:
   referencing the information from the one or more visit data structures.

26. The method of claim 23 wherein the annotating operation comprises:
   storing the information in a page data structure referenced by the one or more visit data structure.

27. The method of claim 23 wherein the annotating operation comprises:
   referencing the information from a page data structure referenced by the one or more visit data structures.

28. The method of claim 23 wherein the searchable characteristic relates to color displayed in the associated resource page.

29. The method of claim 23 wherein the searchable characteristic relates to location of a visual characteristic of the associated resource page.

30. The method of claim 23 wherein the searchable characteristic relates to an audio characteristic of the associated resource page.

31. The method of claim 23 wherein the searchable characteristic relates to a navigational relationship of the associated resource page.

32. The method of claim 31 wherein the navigational relationship identifies a resource page following the associated resource page in a navigational sequence.

33. The method of claim 31 wherein the navigational relationship identifies a resource page preceding the associated resource page in a navigational sequence.

34. The method of claim 23 wherein the searchable characteristic relates to a metadata characteristic of the associated resource page.

35. The method of claim 23 wherein the searchable characteristic relates to content of the associated resource page.

36. The method of claim 23 wherein the searchable characteristic relates to one or more web search parameters associated with the resource page.

37. The method of claim 23 further comprising:
receiving a browser event resulting in a visit to a resource page; and
retrieving the resource page from one of a network and the archive storage.

38. The method of claim 23 further comprising:
displaying identifying information relating to the at least one of the plurality of previously visited resource pages that satisfy the browser sessions search parameter.

39. The method of claim 23 further comprising:
displaying a navigational sequence associated with the at least one of the plurality of previously visited resource pages that satisfy the browser sessions search parameter.

40. The method of claim 23 wherein an annotation resulting from the annotation operation is shared by a plurality of the visit data structures.

41. The method of claim 40 wherein the plurality of visit data structures are designated as being in a same Web trail.

42. The method of claim 40 wherein the plurality of visit data structures are designated as being in a same browser session.

43. The method of claim 23 further comprising:
returning as a search result a Web trail including at least one visit data structure referencing a resource page that satisfies the browser session search parameter.

44. The method of claim 23 further comprising:
returning as a search result a browser session including at least one visit data structure referencing a resource page that satisfies the browser session search parameter.

45. A browser sessions search tool for searching a plurality of previously visited resource pages accessible to the computer system, the browser session search tool comprising:
storage storing a visit data structure recorded in association with each of the resource pages, and storing one or more annotations associated with one or more of the visit data structures specifying at least one searchable characteristic of an associated resource page the one or more annotations including at least a navigation sequence associated with the associated resource page;
a browser sessions search query interface for receiving a browser sessions search parameter specifying a targeted search characteristic; and
a browser sessions search mechanism for searching the storage to identify at least one of the plurality of previously visited resource pages having the searchable characteristic that satisfies the browser sessions search parameter.

* * * * *